United States Patent Office 3,792,073
Patented Feb. 12, 1974

---

3,792,073
PREPARATION OF SILOXANEOXYALKYLENE POLYMERS
Bela Prokai, Mahopac, and Bernard Kanner, West Nyack, N.Y., assignors to Union Carbide Corporation, New York, N.Y.
No Drawing. Filed May 10, 1972, Ser. No. 252,332
Int. Cl. C07f 7/18
U.S. Cl. 260—448.8 R     17 Claims

ABSTRACT OF THE DISCLOSURE

Process for preparing siloxaneoxyalkylene block copolymers comprising reacting an amino-containing siloxane polymer with a polyoxyalkylene hydroxy compound in the presence of carbon dioxide or by reacting a carbamate-containing siloxane polymer with a polyoxyalkylene hydroxy compound.

BACKGROUND OF THE INVENTION

This invention relates to the production of hydrolyzable siloxane-polyether polymers. More particularly this invention relates to a process for preparing high molecular weight hydrolyzable siloxane-polyether polymers.

Hydrolyzable siloxane-polyether polymers are well known in the art and are commonly referred to as siloxane-polyoxyalkylene block copolymers in that the polymers comprise at least one oxyalkylene chain or block joined to at least one siloxane chain or block by a silicon to oxygen to carbon linkage (i.e., a Si—O—C bond).

It is further well known that such hydrolyzable siloxane-polyoxyalkylene block copolymers can be prepared by the polycondensation of polyoxyalkylene diols with amino containing siloxanes. The basic reaction may be illustrated by the following skeletal equation.

$$\equiv \text{SiY} + \text{HOC} \equiv \rightarrow \equiv \text{SiOC} \equiv + \text{HY}$$

wherein Y is an amino group, such as —NH$_2$, —NHZ and —NZ$_2$, wherein Z is a monovalent hydrocarbon radical. Preferably Y is a dimethylamino radical. It is often desirable to strongly acid catalyze such a process to speed-up the reaction rate. For example, trifluoroacetic acid has been employed as a catalyst and although it increases the reaction rate it has the drawback of causing hydrolytic degradation of the product by SiOC cleavage. Thus total removal of the catalyst for product stability by neutralization and filtration is a serious limitation to the commercial production of desired products since the handling of solid catalysts is often necessitated.

It has now been discovered that hydrolyzable siloxane-polyether polymers can be prepared without the disadvantages of long reaction times and solid catalyst removal.

SUMMARY OF THE INVENTION

Accordingly it is an object of this invention to provide an efficient and convenient process for the manufacture of hydrolyzable siloxane-polyether polymers.

It is also an object of this invention to provide a process for preparing high molecular weight hydrolyzable siloxane-polyoxyalkylene block copolymers.

Other objects and advantages of this invention will become readily apparent from the following description and appended claims.

More specifically this invention is directed to a process for preparing hydrolyzable siloxane-polyoxyalkylene block copolymers which comprises reacting in the presence of carbon dioxide an amino containing siloxane polymer consisting essentially of and containing (A) at least one amino siloxy unit represented by the formula

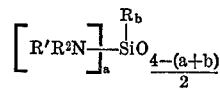

wherein R' and R$^2$ can be the same or different and are selected from the group consisting of hydrogen and a monovalent hydrocarbon radical; R is a monovalent hydrocarbon radical; wherein $a$ is an integer of from 1 to 3 inclusive; $b$ has a value of 0 to 2 inclusive, and wherein the sum of ($a+b$) has a value of 1 to 3 inclusive; and at least one organosiloxy unit represented by the formula

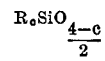

wherein R is the same as defined above and $c$ has a value of 0 to 3 with a polyether hydroxy compound selected from the group consisting of HO(C$_n$H$_{2n}$O)$_y$H and R(OC$_n$H$_{2n}$)$_y$OH wherein $n$ is an integer of at least 2; wherein $y$ is an integer of from 1 to about 1,000 and wherein R is the same as defined above with the proviso that when the siloxane starting material contains three or more —NR$^1$R$^2$ groups the polyether compound can only be R(OC$_n$H$_{2n}$)$_y$OH.

DESCRIPTION OF THE PREFERRED EMBODIMENTS

The hydrolyzable siloxane-polyoxyalkylene block copolymer products of the instant invention thus have at least one block or section to the molecule thereof which is a siloxane polymer and at least one block or section which is a polyoxyalkylene polymer said polyoxyalkylene block being directly bonded to a silicon atom of the siloxane block through an oxygen atom. Without regard to a particular structure or configuration of the molecule, the relative number of siloxane blocks and of polyoxyalkylene blocks present therein, can be illustrated graphically as follows:

$$(W)_m(Z)_n$$

in which W represents a siloxane block and Z represents a polyoxyalkylene block and $m$ and $n$ are each integers whose sum is at least two.

The siloxane block in the polymer products of this invention is a linear siloxane polymer or chain of recurring the siloxane units, —R$_2$SiO—, and is illustrated by the average formula 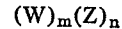, wherein R is the same ase defined above and $x$ is an integer of at least 2. The average molecular weight of each siloxane block of said siloxane-polyoxyalkylene copolymers can range from 148 to 50,000 or higher. Of course it is understood that R need not be identical throughout the siloxane block, but can differ from siloxane unit to siloxane unit and can even be different within a single siloxane unit. Especially preferred siloxane blocks are those consisting essentially of dimethyl-siloxane units, i.e., (Me$_2$SiO)$_x$ wherein Me represents a methyl radical and $x$ is an integer of at least 2.

The polyoxyalkylene block in the polymer products of this invention is a linear predominantly oxyalkylene polymer comprised of recurring oxyalkylene units, (—C$_n$H$_{2n}$O—) and is illustrated by the average formula (—C$_n$H$_{2n}$O)$_y$, wherein $n$ is an integer of at least 2, preferably from 2 to 4 inclusive and $y$ is an integer of 1 to about 1,000, preferably at least 4. The average molecular weight of each polyoxyalkylene block of said siloxane-polyoxyalkylene copolymers can range from 44 to 50,000 or higher. Of course it is understood that the oxyalkylene units need not necessarily be identical throughout the polyoxyalkylene block, but can differ from unit to unit. A polyoxyalkylene block, for example, can be comprised of oxyethylene units, (—C$_2$H$_4$O—); oxypropylene units (—C$_3$H$_6$O—); or oxybutylene units, (—C$_4$H$_8$O—); or mixtures thereof. Preferably the polyoxyalkylene block consists essentially of oxyethylene units or oxypropylene units or a mixture oxyethylene and oxypropylene units.

As is apparent to one skilled in the art at least one end of each polyoxyalkylene block of the hydrolyzable siloxane-polyoxyalkylene block copolymer is linked to a siloxane block by a divalent oxygen atom. Moreover, as is also apparent to one skilled in the art the siloxane-polyoxyalkylene block copolymers are end blocked. Such end blockers are inconsequential in terms of their amount and effect on the block copolymers and are normally and preferably the residual groups of the polyoxyalkylene polymer and/or siloxane polymer reactants used to produce the hydrolyzable siloxane-polyoxyalkylene block copolymers. Of course it is to be understood that the block copolymers can be "capped" by converting reactive groups to less reactive groups by known methods. Moreover end blocking by impurities or a catalyst if employed is also a possibility. It is also to be understood that while said polymer products of this invention can be discrete chemical compounds they are usually mixtures of various discrete block copolymer species due at least in part to the fact that the siloxane and polyoxyalkylene reactants used to produce said polymers are themselves usually mixtures.

Thus the general formula of the particular hydrolyzable siloxane-polyoxyalkylene block copolymer products of this invention is determined by the particular amino-containing siloxane polymer and polyether starting materials employed in the process of this invention which are left to the choice of the operator. For example, the preferred type of hydrolyzable siloxane-polyoxyalkylene block copolymer products of the instant invention are the essentially linear $(AB)_n$ type block copolymers which can be represented by the average formula (I)          $[(R_2SiO)_x(C_nH_{2n}O)_y]_w$ wherein $R$, $x$, $n$ and $y$ are the same as defined above and $w$ is a positive integer. Preferably $R$ is a lower alkyl radical, especially methyl, $x$ has a value of from 2 to about 1000; $n$ is 2 to 4 inclusive; and $y$ and $w$ are both integers of at least four.

Another type of hydrolyzable siloxane-polyoxyalkylene block copolymer products of this invention is the linear ABA type block copolymers which can be represented by the average formula $R[(OC_nH_{2n})_yO]_{3-p}SiR_pO(R_2SiO)_x$
                           $SiR_p[O(C_nH_{2n}O)_yR]_{3-p}$    (II)

wherein $R$, $n$ and $y$ are the same as defined above; $x$ has a value of 0 to about 1000 inclusive and $p$ has a value of from 0 to 2 inclusive. Preferably $R$ is a lower alkyl radical, especially methyl; $x$ has a value of at least 3; $n$ is 2 to 4 inclusive; $y$ has a value of at least 4 and $p$ has a value of two.

A third type of hydrolyzable siloxane-polyoxyalkylene block copolymer products of the instant invention can be represented by the average formula (III)      $R_rSi[O(R_2SiO)_xSiR_2O(C_nH_{2n}O)_yR]_{4-r}$ wherein $R$, $n$ and $y$ are the same as defined above, $x$ has a value of from 1 to about 1000 and $r$ has a value of 0 to 1 inclusive. Preferably $R$ is a lower alkyl radical, especially methyl; $x$ has a value of at least 3; $n$ is 2 to 4 inclusive; $y$ has a value of at least 4 and $r$ is 1.

Still a fourth type of hydrolyzable siloxane-polyoxyalkylene block copolymer products of the instant invention can be represented by the average formula (IV)   $R_3SiO(R_2SiO)_x[RSi(O(C_nH_{2n}O)_yR)O]_qSiR_3$ wherein $R$, $n$ and $y$ are the same as defined above, $x$ has a value of 0 to 1000 inclusive and $q$ has a value of 1 to 1000 inclusive. Preferably $R$ is a lower alkyl radical, especially methyl, $x$ has a value of at least 3; $n$ is 2 to 4 inclusive; $y$ has a value of at least 4; and $q$ has a value of at least 3.

As pointed out above the instant invention is directed to a process for preparing hydrolyzable siloxane-polyoxyalkylene block copolymers by reacting polyether hydroxyl starting materials with amino containing siloxane polymers in the presence of carbon dioxide.

The basic reaction can be illustrated by the following skeletal equation

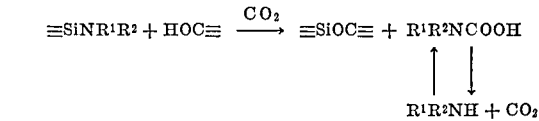

wherein $\equiv SiNR^1R^2$ is the amino-containing siloxane starting material; wherein $HOC\equiv$ is the polyether hydroxyl starting material; wherein $\equiv SiOC\equiv$ is the desired hydrolyzable siloxane-polyoxyalkylene block copolymer product; and wherein $R^1R^2NCOOH$ is a carbamic acid.

Alternatively the process may be described as one in which there is an in situ formation of a carbamate-containing siloxane intermediate which then reacts with the polyether hydroxyl reactant concurrently with the formation of carbamic acid which breaks down to its amine and carbon dioxide gas to form the desired hydrolyzable siloxane-polyoxyalkylene block copolymer product. The overall reaction can thus be illustrated by the following skeletal example $$\equiv SiNMe_2 + CO_2 \rightarrow \equiv SiOCONMe_2$$

$$\equiv SiOCONMe_2 + HOC\equiv \rightarrow \equiv SiOC\equiv + Me_2NCOOH$$

$$Me_2NCOOH \rightleftharpoons CO_2 + Me_2NH$$

wherein Me represents a methyl radical and $$\equiv SiOCONMe_2$$

represents a siloxane dimethyl carbamate intermediate.

It has been surprisingly found that the carbamate siloxane intermediate is far more reactive than the amino containing siloxane toward the polyether hydroxyl starting material. This discovery provides an especially suitable commercial process for preparing high molecular weight hydrolyzable $(AB)_n$ type block copolymers, since it eliminates the problems of long reaction times and solid catalyst removal. The instant process for preparation of said $(AB)_n$ copolymers has been found to permit a five to ten fold reduction in processing time than was previously possible.

It has also been found that at temperatures over 60° C. the formation of the desired hydrolyzable siloxane-polyoxyalkylene block copolymer product of the reaction is accompanied by the liberation of carbon dioxide and $R^1R^2NH$ where $R^1$ and $R^2$ are the same as defined above, e.g. $(CH_3)_2NH$. These can be combined at lower temperatures to form carbamic acid or ammonium carbamate depending upon stoichiometry e.g.

$$CO_2 + Me_2NH \rightleftharpoons Me_2NCOOH$$

or $$2Me_2NH + CO_2 \rightleftharpoons [Me_2NH_2] + [Me_2NCOO]^-$$

wherein Me represents a methyl radical. The carbamic acid or its salt when left in the system causes rapid siloxane-polyoxyalkylene copolymer degradation, when the product is exposed to the atmosphere. Under rigorous anhydrous conditions, the carbamic acid does not degrade the copolymer product even after several days of contact at 25° C. It has been further found that even at temperatures below 60° C. hydrolyzable siloxane-polyoxyalkylene block copolymers can be prepared in the presence of carbon dioxide even though carbamic acid remains in the systems. However it should be removed to insure product stability.

Thus the hydrolyzable $(AB)_n$ type copolymers of Formula I can be prepared by reacting a polyoxyalkylene diol with amino terminated siloxane fluids as illustrated as follows (Ia)

$$wR^1R^2NSiR_2O(R_2SiO)_xSiR_2NR^1R^2 + wHO(C_nH_{2n}O)_yH \xrightarrow{CO_2}$$
$$[R^1R^2NCOOSiR_2O(R_2SiO)_xSiR_2OCONR^1R^2]_w \longrightarrow$$
Intermediate
$$-\!\!\left[O(C_nH_{2n}O)_ySiR_2O(R_2SiO)_xSiR_2\right]\!\!- + 2wR^1R^2NCOOH$$
$$\Updownarrow$$
$$2wR^1R^2NH + CO_2$$

wherein $w$, $R^1$, $R^2$, $R$, $x$, $n$ and $y$ are the same as defined above in Formula I.

The hydrolyzable ABA type copolymers of Formula II can be prepared by reacting a polyoxyalkylene monohydroxyl compound with amino terminated siloxane fluids as illustrated as follows (IIa)

$$(R^1R^2N)_{3-p}SiR_pO(R_2SiO)_xR_p(NR^1R^2)_{3-p} + 2(3-p)R(OC_nH_{2n})_yOH \xrightarrow{CO_2}$$
$$[(R^1R^2NCOO)_{3-p}SiR_pO(R_2SiO)_xSiR_p(OCONR^1R^2)_{3-p}] \longrightarrow$$
Intermediate
$$[R(OC_nH_{2n})_yO]_{3-p}SiR_pO(R_2SiO)_xSiR_p[O(C_nH_{2n}O)_yR]_{3-p} +$$
$$2(3-p)R^1R^2NCOOH \rightleftarrows 2(3-p)R^1R^2NH + 2(3-p)CO_2$$

wherein $R^1$, $R^2$, $R$, $p$, $x$, $n$ and $y$ are the same as defined above in Formula II.

The hydrolyzable block copolymers of Formula III can be prepared by reacting a polyoxyalkylene monohydroxyl compound with an amino terminated siloxane polymer as illustrated as follows (IIIa)

$$R_rSi[O(R_2SiO)_xSiR_2NR^1R^2]_{4-r} + (4-r)R(OC_nH_{2n})_yOH \xrightarrow{CO_2}$$
$$[R_rSi[O(R_2SiO)_xSiR_2OCONR^1R^2]_{4-r}] \longrightarrow$$
Intermediate
$$R_rSi[O(R_2SiO)_xSiR_2O(C_nH_{2n}O)_yR]_{4-r} + R^1R^2NCOOH \rightleftarrows$$
$$(4-r)R^1R^2NH + (4-r)CO_2$$

wherein $R$, $r$, $x$, $R^1$, $R^2$ $n$ and $y$ are the same as defined above in Formula III.

The hydrolyzable block copolymers of Formula IV can be prepared by reacting a copolyoxyalkylene monohydroxyl compound with a siloxane polymer containing amino groups bonded to internal (pendent) silicon atoms as illustrated as follows $$R_3SiO(R_2SiO)_x[RSi(NR^1R^2)O]_qSiR_3 + qR(OC_nH_{2n})_yOH \xrightarrow{CO_2}$$
$$R_3SiO(R_2SiO)_x[RSi(OCONR^1R^2)O]_qSiR_3 \longrightarrow$$
Intermediate
$$R_3SiO(R_2SiO)_x[RSi(O(C_nH_{2n}O)_yR)O]_qSiR_3 +$$
$$qR^1R^2NCOOH \rightleftarrows qR^1R^2NH + qCO_2$$
(IVa)

wherein $R$, $x$, $R^1$, $R^2$, $q$ $n$ and $y$ are the same as defined above in Formula IV.

Illustrative of the monovalent hydrocarbon groups that are represented by R above are alkyl groups (such as, methyl, ethyl, propyl, isopropyl, butyl, pentyl, hexyl, octyl, decyl, dodecyl, octadecyl, eicosyl, and the like); cycloalkenyl groups (such as, cyclohexenyl, and the like); aryl groups (such as, phenyl, naphthyl, and the like); aralkyl groups (such as, benzyl, phenylethyl and the like); alkaryl groups (such as, tolyl, xylyl, and the like); cycloalkyl groups (such as cyclohexyl, and the like); and alkenyl groups (such as, vinyl, allyl, and the like). If desired, such groups can contain substituents such as chlorine, bromine, fluorene, nitro, cyano, alkoxy, and the like, so long as they do not adversely affect the instant invention. Preferably R is a monovalent hydrocarbon radical free from aliphatic unsaturation and containing from 1 to 20 carbon atoms, while lower alkyl and phenyl radicals are most preferred especially methyl.

The amino containing siloxane starting materials useful in the process of the instant invention and/or for their preparation are well known in the art as witnessed for example by U.S. Pat. Nos. 3,467,686; 3,530,092; 3,535,357; and 3,519,601, the disclosures of which are incorporated herein by reference thereto. Obviously the choice of such N,N-diorganoamino substituted siloxane compounds merely depends on the particular hydrolyzable siloxane-polyoxyalkylene block copolymer desired to be produced. Of course it is to be understood that the aminosiloxane starting materials can be an individual compound, a mixture of polymers of the same class and type or a mixture of polymers of different classes and types. Thus the amino-containing siloxane polymer starting materials are those consisting essentially of and containing (A) at least one amino siloxy unit represented by the formula $$[R^1R^2N]_aSiO_{\frac{(4-a+b)}{2}}^{R_b}$$

and at least one organosiloxy unit represented by the formula $$R_cSiO_{\frac{4-c}{2}}$$

wherein $R^1$, $R^2$, $R$, $a$, $b$ and $c$ are the same as defined above. Illustrative of the monovalent hydrocarbon radicals that may be represented by $R^1$ and $R^2$ above are the monovalent hydrocarbon and substituted monovalent hydrocarbon radicals as defined for R above. Similarly the most preferred $R^1$ and $R^2$ radicals are lower alkyl radicals which can be the same or different, although the most preferred $R^1R^2N-$ radical is a dimethylamino radical, i.e. $Me_2N-$.

The various types of preferred amino-containing siloxane polymer starting materials used to prepare the desired hydrolyzable siloxane-polyoxyalkylene block copolymers of Formulas I through IV above are clearly set forth in reactions Ia through IVa.

Since the reactions of IIa through IVa depicted above are directed to the ultimate conversion of the amino group on the starting siloxane material to a polyoxyalkylene radical, the molecular weight of the desired hydrolyzable siloxane-polyoxyalkylene block copolymer product is obviously going to be governed by the reactants employed. It is most preferred, however, to employ the instant process for the production of hydrolyzable $(AB)_n$ type block copolymers as shown by reaction Ia above. In this instance low molecular weight linear amino terminated siloxane polymer fluids consisting essentially of terminal amino siloxy units of the formula $$R^1R^2NSiR_2O_{0.5}-$$

and organo siloxy units for the formula $R_2SiO-$ can be converted into higher molecular weight siloxane-polyoxyalkylene block copolymers due to the repeating siloxane and polyoxyalkylene blocks in the final $(AB)_n$ product. Such $(AB)_n$ copolymer products preferably have an average molecular weight of about 65,000 on up to 250,000 or higher.

These preferred high molecular weight hydrolyzable siloxane-polyoxyalkylene block $(AB)_n$ type copolymer products can be represented by the average formula $$[R_2SiO)_x(C_nH_{2n}O)_y]_w$$

wherein R represents a monovalent hydrocarbon radical free from aliphatic unsaturation; $n$ is an integer of from 2 to 4 inclusive; $x$ is an integer of at least 7; $y$ is an integer of at least 4; $w$ is an integer of at least 4; the average molecular weight of each siloxane block being from about 500 to about 10,000; the average molecular weight of each polyoxyalkylene block being from about 300 to about 10,000; said siloxane and polyoxyalkylene blocks being linked by the silicon to oxygen to carbon linkages; the siloxane blocks constituting from about 20 to about 85 weight percent of the copolymer; the polyoxyalkylene blocks constituting about 80 to about 15 weight percent of the copolymer; and the block copolymer having an average molecular weight of at least about 65,000.

The most preferred high molecular weight $(AB)_n$ hydrolyzable siloxane-polyoxyalkylene block copolymers can be represented by the average formula $$[(R_2SiO)_x(C_nH_{2n}O)_y]_w$$

wherein R represents a monovalent hydrocarbon radical free from aliphatic unsaturation, preferably lower alkyl, especially methyl; wherein $(C_nH_{2n}O)$ represents a mixture consisting of about 30 to about 75 weight percent, preferably about 50 weight percent of oxyethylene groups and about 70 to about 25 weight percent, preferably about 50 weight percent of oxypropylene groups wherein $x$ is an integer of at least 7; wherein $y$ is an integer of at least 4, wherein the average molecular weight of each siloxane block ranges from about 500 to about 10,000, preferably about 500 to about 5,000 and most preferably about 1,000 to about 3,500; wherein the average molecular weight of each polyoxyalkylene block ranges from about 300 to about 10,000, preferably about 1,000 to about 5,000 and most preferably about 2,000 to about 3,500; wherein the siloxane blocks constitute about 25 to about 50 weight percent, preferably about 30 to about 45 weight percent of the copolymer; wherein the polyoxyalkylene blocks constitute about 75 to about 50 weight percent, preferably about 70 to about 55 weight percent of the copolymer; and wherein the block copolymer has an average molecular weight of at least about 65,000, preferably at least about 100,000, up to about 250,000 or higher.

The polyoxyalkylene mono or dihydroxy starting materials employed in the process of the instant invention, as well as methods for their preparation are well known in the art as witnessed for example by U.S. Pats., 2,425,825; 2,448,664; 2,834,748; 2,917,480; 3,480,583 and many other patents too numerous to mention, the disclosures of which are incorporated herein by reference thereto. Such compounds are conventionally prepared by the reaction of an alkylene oxide or oxides with a monohydric alcohol or dihydroxyalkylene compound. When more than one alkylene oxide is employed, they can be added to the hydroxy starter sequentially and in any order or they can be first admixed and the admixture added to the hydroxy starter. Such polyoxyalkylene compounds are widely available commercially. Examples of such compounds include monohydroxy polyalkylene monoethers such as $$R(OC_nH_{2n})_yOH$$

and polyoxyalkylene diols such as $$HO(C_nH_{2n}O)_yH$$

wherein R, $n$ and $y$ are the same as defined above. Preferably R is a lower alkyl radical, especially methyl; $n$ has a value of from 2 to 4 inclusive and $y$ has a value of at least 4. Illustrative of the more preferred hydroxy starting materials include, e.g. monohydroxy oxyethylene monomethylethers; monohydroxy oxy - 1,2 - propylene monomethylethers; monohydroxy oxyethylene-oxy-1,2-propylene monoethylethers, polyoxyethylene glycols, polyoxypropylene glycols, polyoxybutylene glycols and the polyoxyethylene-polyoxypropylene diols. Of course it is to be understood that it is also well known that polyoxyalkylene hydroxy compounds can be made by reacting alkylene oxides with other compounds having labile hydrogen atoms, such as alkyl and aryl dithiols, alkyl and aryl diamines, aryl diols, and the like, e.g., ethylenedithiols, hexamethylene diamine, m-phenylene diamine, 4, 4'-dihydroxydiphenyl propane, and the like. Such polyoxyalkylene hydroxy compounds made from these diverse starting materials also form block copolymers of the same general type with the siloxane polymers and are to be included within the term polyoxyalkylene block as used herein, since the starting fragment of such polyoxyalkylene hydroxy compound forms an insignificant fraction of the block copolymer. The specific polyoxyalkylene hydroxy compound employed will of course merely depend upon the final block copolymer product desired and its intended use.

In the process of the instant invention it is feasible to react siloxane polymer starting materials that contain three or more —$NR^1R^2$ amino groups only with polyoxyalkylene monohydroxy compounds since the use of polyoxyalkylene dihydroxy compounds with such starting materials leads to cross-linking and gellation of the product. In this context it is also preferred to avoid the use of siloxane starting materials that have hydroxy groups directly bonded to the silicon atoms. Of course it is understood that siloxane starting materials that contain one or two —$NR^1R^2$ amino groups can be reacted with either polyoxyalkylene mono- or dihydroxy compounds to produce liquid block copolymers.

The process of the instant invention is preferably conducted under anhydrous conditions at a temperature of from about 25° C. to 300° C., preferably about 100° C. to 200° C. The reaction may be run at atmospheric pressure, although pressures higher than atmospheric pressure are generally preferable in order to increase the temperature of the reaction. The process can be carried out batchwise or continuously. The reaction is also preferably conducted in the presence of an inert organic solvent. Any suitable inert organic solvent or mixtures thereof can be employed. Illustrative solvents include such compounds as aromatic hydrocarbons and alkylated aromatic hydrocarbons having boiling points in the range of about 105° to 300° C. such as benzene, toluene, xylene and the like; as well as ethers such as diethyl Carbitol, dibutyl Carbitol, diethoxy tetraglycol, and the like. The solvent can be removed if desired from the final polymer product by any conventional method, e.g. distillation, however such is not necessary. The instant carbon dioxide process of this invention does not require the use of catalysts nor are they generally desired, however conventional aminohydroxy or carbamate-hydroxy catalysts can be present.

As depicted above the amino-containing siloxane polymer and polyaxyalkylene hydroxy starting materials are generally employed in equimolar amounts although higher and lower amounts can be used if desired. When employing polyoxyalkylene monohydroxy starting materials it is generally preferred to use a stoichiometric excess of the hydroxy compound in order to insure conversion of all of the diorganoamino groups on the siloxane starting material. However, when forming high molecular weight $(AB)_n$ type copolymer products, in order to insure a maximum degree of polymerization and efficiency the siloxane and polyoxyalkylene dihydroxy reactants should be employed in exactly equimolar amounts or as near to this as possible for as one deviates from the use of equimolar amounts the block copolymer product may not have as high a molecular weight as desired. Likewise it is preferred to employ the reactants in as pure a form as possible and therefore it may often be desirable to sparge and dehydrate the reactants prior to use in order to avoid hazy and/or contaminated products. However, monofunctional and trifunctional impurities e.g. monohydroxy and trihydroxy compounds and mixtures thereof, such as might be present in the materials employed to prepare the $(AB)_n$ type copolymers, up to about three percent may be present.

Theoretically one mole of carbon dioxide will convert one mole of the diorganoamino group on the siloxane starting material to one mole of the diorganocarbamate radical of the in situ formed intermediate of the instant process. However in the instant invention it is preferred to use an amount that is in excess of the stoichiometric equivalent required to react with all of the diorganoamino radicals on the starting siloxane polymer. Indeed in the case of preparing high molecular weight hydrolyzable $(AB)_n$ type copolymer products, it is preferred to employ such a stoichiometric excess of carbon dioxide as to saturate the reaction system. This can be achieved by sparging the reaction mixture with carbon dioxide during the reaction. The actual amount of carbon dioxide employed in each instance will of course merely depend on the desired copolymer product to be produced as well as how efficient an operation one desires, the determination of which is obviously well within the routine experimentation of those skilled in the art, for example by monitoring the molecular weight of the block copolymer product until such time it becomes constant signifying no further reaction and completion of the process.

As pointed out above, it is generally desired to remove the carbamic acid by-product from the copolymer product. This is done by collecting the amine by-product and carbon dioxide during the reaction. When producing high molecular weight $(AB)_n$ type block copolymer products, in order to avoid the formation of large amounts of carbamic acid which could cause problems in the final product, the reaction is conducted under a nitrogen sparge for a period of time, e.g. up to 50 percent completion of the reaction. At this point a carbon dioxide sparge is substituted to bring the copolymer product to the desired molecular weight and performance. The product may then be sparged again with nitrogen for a few minutes during its cool down period.

Alternatively, if desired a diorganocarbamate containing siloxane intermediate can be formed first under a carbon dioxide sparge followed by a nitrogen sparge until the desired polymer product is obtained. Accordingly it is another aspect of this invention to provide for the formation of hydrolyzable siloxane-polyoxyalkylene block copolymer products by reacting a preformed diorganocarbamate siloxane polymer with a polyoxyalkylene hydroxy compound. Illustrative of such diorganocarbamate containing siloxane polymers are those consisting essentially of and containing (A) at least one carbamate siloxy unit having the formula

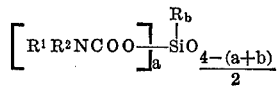

wherein R, $R^1$, $R^2$, $a$, $b$ and $(a+b)$ are the same as defined above and at least one organosiloxy unit represented by the formula

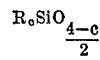

wherein R and $c$ are the same as defined above. Such carbamate containing siloxane polymers and their production are more fully discussed in the concurrently filed U.S. application Ser. No. 252,330. The preferred carbamate containing siloxanes parallel the preferred amino containing siloxanes described above. Likewise the prefered polyoxyalkylene hydroxy compounds of this alternative process are also described above, while the reaction conditions of said process parallel the well-known aminosiloxanes and polyether hydroxyl reactions, save for the discovery that an uncatalyzed carbamate-siloxane and hydroxy polyether reaction will proceed at a faster rate then an uncatalyzed amino-siloxane and hydroxy polyether reaction. However, the instant carbon dioxide process described above, wherein its extremely fast reaction rate may be explained on the basis of in situ carbon dioxide insertion into the silicon-amino bonds of the siloxane starting material to give carbamate containing siloxane intermediates which in turn react with the hydroxyl groups of the polyether to give hydrolyzable siloxane-polyether block copolymers, is preferred over the alternative process of using preformed diorganocarbamate containing siloxane starting materials.

The hydrolyzable siloxane-polyoxyalkylene block copolymers of this invention have a wide variety of uses in a number of fields, well known in the art. They have been found particularly useful as surfactant foam stabilizers in the production of polyester and polyether urethane foam as witnessed for example by U.S. Pats. 3,467,686; 3,530,092; 3,535,357 and 3,519,601 as well as U.S. applications, Ser. No. 795,674, filed Jan. 31, 1969; now abandoned; Ser. No. 122,164; filed May 8, 1971 and Ser. No. 212,729, filed Dec. 29, 1971, the disclosures of which patents and applications are incorporated herein by reference thereto.

As defined herein, the molecular weights for the various linear $(AB)_n$ copolymer product compositions of this invention and those given in the following examples were measured by Gel Permeation Chromatography using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. The use of Gel Permeation Chromatography for measuring molecular weights in discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore.

In the following examples the procedure described in the article entitled "Characterization of Silicones by Gel Permeation Chromatography" by F. Rodriguez et al. in I & EC Product and Development, vol. 5, No. 2, page 121, June 1966 was followed using five styragel packed columns (Waters Associates, Inc.) having a pore size of $3+10^3$ A., $10^4$ A., $10^5$ A., $3 \times 10^5$ A. and $10^6$ A., respectively.

The following examples illustrate the present invention and are not to be regarded as limitative. It is to be understood that Me represents a methyl radical; G.P.C. designates Gel Permeation Chromatography; and that all of the parts, percentages and proportions referred to herein and in the appended claims are by weight unless otherwise indicated.

EXAMPLE 1

In a one-liter flask equipped with fractionating column, thermometer, stirrer and a nitrogen inlet tube for sparging there were placed 72.0 g. (0.05 mole) of diemthyl-amino-terminated polydimethylsiloxane having an average weight of 1440, 149.5 g. (0.05 mole) of polyoxyethylene polyoxy - 1,2 - propylene glycol comprising 50 weight percent ethylene oxide and 50 weight percent propylene oxide and having an average molecular weight of 2985 and 217.0 g. of xylene. The reaction was stirred vigorously, with constant nitrogen sparge (about 0.1 ft.³/min.), as the temperature of the vessel was brought up to about 140° C. over a period of ½ hour. The reaction was not homogeneous in the first 1-2 hours of the reaction time, but became homogeneous as the reaction was progressing with the continuous removal of dimethylamine. The reaction mixture was heated at 140° C. for 44 hours, at this time percent solid was determined and was found to be 65 percent. The concentration was adjusted to 50 percent active solid by addition of xylene solvent. After this operation, the mixture was further sparged at 140° C. for an additional two more hours to help remove trace amounts of trapped dimethylamine. The mixture was then cooled and about a 100% yield of the hydrolyzable siloxane-polyoxyalkylene block copolymer product was obtained. Said block copolymer had an average molecular weight of 250,000 as established by GPC, the siloxane blocks constituted about 31.3 weight percent of the block copolymer. Said copolymer also exhibited a 10 percent aqueous pH of about 7.1. The block copolymer can be represented by the average formula

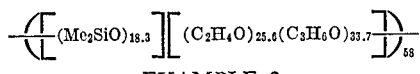

EXAMPLE 2

Following the procedure of Example 1, a similar block copolymer was prepared employing 114 g. (0.01 mole) of dimethylamino-terminated polydimethylsiloxane having an average molecular weight of 1140 and 267 g. (0.01 mole) of polyoxyethylene-polyoxy-1,2-propylene oxide comprising 50 weight percent ethylene oxide and 50 weight percent propylene oxide and having an average molecular weight of 2670. After heating the reaction mixture at 140° C. for nine hours the hydrolyzable siloxane-polyoxyalkylene block copolymer product formed was found to have an average molecular weight of 22,500 as established by GPC. The block copolymer can be represented by the average formula

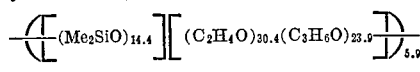

EXAMPLE 3

Into a one-liter three-necked flask, equipped with condenser, fractionating head, thermometer, stirrer, and a $N_2/CO_2$ inlet tube for sparging, yere placed 149.26 grams (0.05 mole) of polyoxyethylene-polyoxy-1,2-propylene glycol comprising 50 weight percent ethylene oxide and 50 weight percent propylene oxide and having an average molecular weight of 2985 and 230 grams of xylene. The mixture was heated at 140° C. with $N_2$ sparge to remove any residual water. The reaction mixture was then cooled to 70° C. and at that temperature 80.0 grams (0.05 mole) of dimethylamino-terminated polydimethylsiloxane having an average molecular weight of 1600 was added. The reaction mixture under constant nitrogen sparge (about 0.1 ft.$^3$/min.) was brought up to 142° C. over a period of 15 minutes and maintained for two hours. The nitrogen sparging was then replaced with $CO_2$ sparging (about 0.1 ft.$^3$/min.) and the reaction maintained for an additional seven hours followed by a half hour of spraying with $N_2$. During the reaction dimethyl carbamic acid was removed from the system by slow removal of volatiles at 5 to 8 ml. per hour. The mixture was then cooled and about a 100% yield of the desired hydrolyzable siloxane-polyoxyalkylene block copolymer was obtained. Said block copolymer had an average molecular weight of 150,000 as established by GPC and a viscosity (cps. at 51.4% copolymer content in xylene at room temperature) of about 9,100. The block copolymer can be represented by the average formula

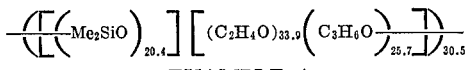

EXAMPLE 4

In a one-liter flask equipped with Dean-Stark trap, condenser, thermometer, stirrer, and an inlet tube for sparging therew ere placed 149.3 grams (0.05 mole) of polyoxyethylene-polyoxy-1,2-propylene glycol comprising 50 weight percent ethylene oxide and 50 weight percent propylene oxide and having an average molecular weight of 2985, and 230 grams of xylene. Under nitrogen sparging (about 0.1 ft.$^3$/min.) xylene (25 ml.) containing water from azeotropic drying was distilled into Dean-Stark trap, which was then removed, with the volatiles collected in the trap from the system. After cooling to 25° C., 80.0 grams (0.05 mole) of dimethylamino-terminated polydimethylsiloxane having an average molecular weight of 1600 was added and rinsed down with 25 ml. of additional xylene. The nitrogen sparge was then replaced with carbon dioxide spraging (about 0.1 ft.$^3$/min.) and the mixture stirred; within two hours at 25° C. it became homogeneous. After 4 hours and 45 minutes at 25° C. the hydrolyzable siloxanes polyoxyalkylene block copolymer formed was found to have an average molecular weight of 75,000 as established by GPC. The block copolymer can be repby the average formula

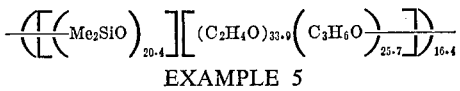

EXAMPLE 5

The procedure of Example 4 was repeated using the same equipment and reactants with the exception that carbon dioxide spraging was not employed. Instead the reaction mixture was maintained at 25° C. under nitrogen sparging for 7 hours and the hydrolyzable siloxane-polyoxyalkylene block copolymer product formed was found to have an average molecular weight of 11,500 as established by GPC. This block copolymer can be represented by the average formula

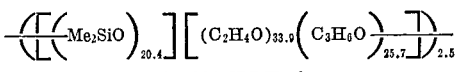

EXAMPLE 6

The procedure of Example 4 was repeated using the same equipment and reactants with the exception that the dimethylamino terminatetd polymdimethyl siloxane starting material was added at 50° C. and the reaction maintained at 50° C. The reaction mixture became homogeneous in one hour. After 4 hours reaction time with constant $CO_2$ sparging (about 0.1 ft.$^3$/min.) the average molecular weight of the hydrolyzable siloxane-polyoxyalkylene block copolymer product obtained was 86,000 as established by GPC.

EXAMPLE 7

The procedure of Example 4 was repeated using the same equipment and reactants with the exception that the dimethylamino terminated polydimethyl siloxane starting material was added at 85° C.–90° C. and the reaction maintained at 85° C.–90° C. The reaction mixture became homogeneous in four hours and forty minutes. After 6½ and 22½ hours reaction time with constant $CO_2$ sparging (about 0.1 ft.$^3$/min.) the hydrolyzable siloxane-polyoxyalkylene $(AB)_n$ block copolymer product obtained was 18,000 and 77,000 respectively, as established by GPC.

EXAMPLE 8

Into a one-liter three-necked flask, equipped with condenser, fractionating head, thermometer, stirrer, and a $N_2/CO_2$ inlet tube for sparging, were placed 77.5 g. (0.05 mole) of dimethylamino-terminated polydimethylsiloxane having an average molecular weight of 1550 and 230 grams of xylene. The mixture was then sparged with carbon dioxide (about 0.1 ft.$^3$/min.) at 25° C. for three hours. After this time the carbon dioxide sparging was stopped and 149.25 grams (0.05 mole) of polyoxyethylene-polyoxy-1,2-propylene glycol comprising 50 weight percent ethylene oxide and 50 weight percent propylene oxide and having an average molecular weight of 2985 were added and the mixture which was heated to 140° C. under constant nitrogen sparging (about 0.1 ft.$^3$/min.) for 20 hours. The reaction mixture was then cooled and about a 100% yield of the desired hydrolyzable siloxane-polyoxyalkylene block copolymer was obtained. Said block copolymer had an average molecular weight of 100,000 as established by GPC and a viscosity (cps. at 62.1% copolymer content in xylene at room temperature of about 9410. The block copolymer can be represented by the average formula

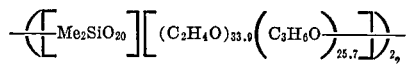

This example demonstrates the formation of a dimethylcarbamate-terminated polydimethylsiloxane intermediate which in turn reacts with the polyoxyalkylene diol to form the desired copolymer product.

Following the above outlined procedure of Example 3, a series of high molecular weight hydrolyzable siloxane-polyoxyalkylene $(AB)_n$ block copolymers (Examples 9–13) were prepared employing the reactants and conditions illustrated in Table I below.

TABLE I

| Example number | Siloxane reactant [1] | | | Polyoxyalkylene diol [2] | | | Reaction condition,[3] sparging at 140° C. | Percent Copolymer in xylene as made | GPC, avg. mol. wt. | Viscosity as made at 25° C. (cps.) |
|---|---|---|---|---|---|---|---|---|---|---|
| | Avg. mol. wt. | Gram | Mole | Avg. mol. wt. | Gram | Mole | | | | |
| 9 | 1,600 | 80.0 | 0.05 | 2,985 | 149.5 | 0.05 | 2 hrs. with $N_2$ / 8 hrs. with $CO_2$ | 46 | 250,000 | 68,960 |
| 10 | 1,600 | 80.0 | 0.075 | 2,985 | 149.5 | 0.05 | 2 hrs. with $N_2$ / 5 hrs. with $CO_2$ | 51.1 | 152,000 | 14,090 |
| 11 | 1,550 | 77.5 | 0.05 | 2,985 | 149.5 | 0.05 | 3 hrs. with $N_2$ / 12 hrs. with $CO_2$ | 59.4 | 200,000 | 62,720 |
| 12 | 1,550 | 77.5 | 0.05 | 2,985 | 149.5 | 0.05 | 2 hrs. with $N_2$ / 17 hrs. with $CO_2$ | 36.1 | 215,000 | 3,426 |
| 13 | 1,550 | 77.5 | 0.05 | 2,985 | 149.5 | 0.05 | 2 hrs. wi $N_2$ / 12 hrs. with $CO_2$ | 42 | 142,000 | 3,090 |

[1] Siloxane reactant: $Me_2N(Me_2)SiO(SiMe_2O)_zSi(Me_2)NMe_2$ where $z$ is an integer with values to give the appropriate molecular weights.
[2] Polyoxyalkylene diol reactant: $HO—(C_2H_4O)_x(C_3H_6O)_yH$ where $x$ and $y$ are integers with values to give the appropriate molecular weights said diols all comprising about 50 weight percent ethylene oxide and about 50 weight percent propylene oxide.
[3] All the reaction examples were carried out in the presence of xylene solvent and sparging was done at about 0.1 ft.³/min.

EXAMPLE 14

Eight siloxane-polyoxyalkylene block copolymers were tested for froth stabilization of a polyurethane foam forming system. The mixtures were mechanically frothed in a 5-quart Hobart N–50 mixer using a D-wire whip for a reasonable time as specified in Table II below. The polyurethane foam forming systems were prepared from the following ingredients.

| Ingredients: | Parts by weight |
|---|---|
| Polyol Blend [1] | 100 |
| TDI [2] | 22.3 |
| TMBA [3] | 0.1 |
| Nickel acetylacetonate | 0.2 |
| Surfactant (as listed in Table II) | Varied |

[1] The polyol blend had the following formulation

| | Parts by weight |
|---|---|
| Polyol[1] | 55 |
| Polyol[2] | 20 |
| Polyol[3] | 25 |

Polyol[1] is a graft copolymer of about 20 weight percent acrylonitrile and about 80 weight percent of a glycerol started propeylene oxide adduct triol having a molecular weight of about 3,000 and a hydroxyl number of about 56; the graft copolymer having a hydroxyl number of about 45.
Polyol[2] is a glycerol started propylene oxide adduct triol having a molecular weight of about 700 and a hydroxyl number of about 240.
Polyol[3] is a poly-ε-caprolactone diol having a molecular weight of about 1500 and a hydroxyl number of about 212.
[2] TDI as used herein designates a mixture of about 80 weight percent of 2,4-tolylene diisocyanate and about 20 weight percent of 2,6-tolylene diisocyanate.
[3] TMBDA: N,N,N′,N′-tetramethyl-1,3,butanediamine.

The surfactants as listed in Table II below are based on 100 percent active copolymers. In practice 50 percent active surfactant solutions were used in the xylene solvent in which they were prepared.

A number of the froths were also cured to produce a tack free polyurethane foam having the densities listed in Table II below within 10 minutes at 125° C.

TABLE II

| Run number | Surfactant used, example | Surfactant concentration, pts. by wt. | Froth density, lb./ft.³ | Frothing time, min. | Froth stability | Foam density lb./ft.³ |
|---|---|---|---|---|---|---|
| 1 | 1 | 4 | 17 | 10 | Stable | 15 |
| 2 | 3 | 4 | 17 | 10 | do | 15 |
| 3 | 8 | 4 | 19.3 | 10 | do | |
| 4 | 9 | 4 | 16.5 | 10 | do | 14 |
| 5 | 10 | 4 | 17.4 | 10 | do | |
| 6 | 11 | 4 | 17.7 | 10 | do | |
| 7 | 12 | 4 | 15.1 | 10 | do | 13 |
| 8 | 13 | 4 | 17.9 | 10 | do | |

Various modifications and variations of this invention will be obvious to a worker skilled in the art and it is to be understood that such modifications and variations are to be included within the purview of this application and the spirit and scope of the appended claims.

What is claimed is:
1. A process for preparing hydrolyzable siloxane-polyoxyalkylene block copolymers consisting essentially of at least one siloxane block and at least one polyoxyalkylene block, said polyoxyalkylene block being directly bonded to a silicon atom of the siloxane block through an oxygen atom, said siloxane blocks having the average formula $(R_2SiO)_x$ wherein R is a monovalent hydrocarbon radical containing from 1 to 20 carbon atoms and $x$ is an integer of at least 2, said polyoxyalkylene block having the average formula $(C_nH_{2n}O)_y$ wherein $n$ is an integer at least 2 and $y$ is an integer of 1 to about 1000 said process comprising reacting an amino containing siloxane polymer consisting essentially of and containing (A) at least one amino siloxy unit of the formula

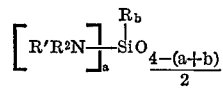

wherein R′ and R² are individually selected from the class consisting of hydrogen and a monovalent hydrocarbon radical containing from 1 to 20 carbon atoms; R is the same as defined above; $a$ is an integer of from 1 to 3 inclusive; $b$ has a value of 0 to 2 inclusive and wherein the sum of $(a+b)$ has a value of 1 to 3 inclusive; and at least one siloxy unit of the formula

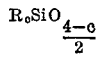

wherein R is the same as defined above and $c$ has a value of 0 to 3 inclusive with a polyalkylene hydroxy compound selected from the class consisting of

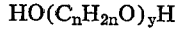

and $R(OC_nH_{2n})_yOH$ wherein R, $n$ and $y$ are the same as defined above; in the presence of an amount of carbon dioxide that is in excess to the stoichiometric equivalent required for carbon dioxide to react with all the $—NR′R^2$ groups on the siloxane starting material; and wherein an inert organic solvent is also present; with the proviso that when the siloxane starting material contains three or more $—NR′R^2$ groups the polyoxyalkylene hydroxy compound can only be $R(OC_nH_{2n})_yOH$.

2. A process as defined in claim 1, wherein R, R′ and R² are lower alkyl radicals; wherein $x$ has a value of 2 to 1000; wherein $n$ has a value of 2 to 4 inclusive; wherein $a$ is 1 and wherein $b$ is 1 or 2.

3. A process as defined in claim 2, wherein R, R′ and R² are methyl radicals.

4. A process as defined in claim 1, wherein the amino-containing siloxane starting material has the average formula

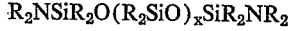

wherein R is a lower alkyl radical; $x$ has a value from 2 to 1000; and wherein the polyoxyalkylene hydroxy compound is $HO(C_nH_{2n}O)_yH$ wherein $n$ is 2 to 4 inclusive and $y$ has a value of 4 to 1000.

5. A process as defined in claim 4, wherein R is a methyl radical.

6. A process as defined in claim 1, for producing hydrolyzable siloxane polyoxyalkylene block copolymers having the average formula $$[(Me_2SiO)_x(C_nH_{2n}O)_y]_w$$

wherein Me is a methyl radical; $x$ has a value of at least 7; $n$ has a value of 2 to 4 inclusive; $y$ and $w$ each have values of at least 4; wherein the average molecular weight of each siloxane block is from about 1000 to about 3,500; wherein the average molecular weight of each polyoxyalkylene block is from about 2,000 to about 3,500; wherein the siloxane blocks constitute about 30 to 45 weight percent of the copolymer; wherein the polyoxyalkylene blocks constitute about 70 to 55 weight percent of the copolymer and wherein the block copolymer has an average molecular weight of at least about 65,000; and wherein the amino- containing siloxane starting material has the average formula $$Me_2NSiMe_2O(Me_2SiO)_xSiMe_2NMe_2$$

wherein Me is a methyl radical; $x$ has a value of at least 5; and the siloxane polymer has an average molecular weight of about 1000 to about 3,500; and wherein the formula $$HO(C_nH_{2n}O)_yH$$

wherein $n$ and $y$ are the same as defined above and the polyoxyalkylene compound has an average molecular weight of about 2,000 to about 3,500.

7. A process as defined in claim 6, wherein $(C_nH_{2n}O)$ represents a mixture consisting of amout 50 weight percent of oxyethylene groups and about 50 weight percent of oxypropylene group.

8. A process as defined in claim 1, wherein the carbon dioxide is sparged into the reaction mixture during the reaction.

9. A process as defined in claim 6, wherein the carbon dioxide is sparged into the reaction mixture during the reaction.

10. A process as defined in claim 1, wherein the reaction mixture is first sparged with nitrogen and then the reaction mixture is sparged with carbon dioxide until the desired hydrolyzable siloxanepolyoxyalkylene block copolymer is obtained.

11. A process as defined in claim 6, wherein the reaction mixture is first sparged with nitrogen and then the reaction mixture is sparged with carbon dioxide until the desired hydrolyzable siloxane polyoxyalkylene block copolymer is obtained.

12. A process as defined in claim 6, wherein the reaction mixture is first sparged with nitrogen and then the then sparged with nitrogen until the desired hydrolyzable siloxane-polyoxyalkylene block copolymer is obtained.

13. A process for preparing hydrolyzable siloxane polyoxyalkylene block copolymers as defined in claim 1, said process comprising reacting a carbamate containing siloxane polymer consisting essentially of and containing (A) at least one carbamate siloxy unit of the formula $$\left[R'R^2NCOO\underset{a}{\vert}SiO\right]_{\frac{4-(a+b)}{2}}^{R_b}$$

wherein R' and R² are individually selected from the class consisting of hydrogen and a monovalent hydrocarbon radical containing from 1 to 20 carbon atoms; R is the same as defined above; $a$ is an integer of from 1 to 3 inclusive; $b$ has a value of 0 to 2 inclusive and wherein the sum of $(a+b)$ has a value of 1 to 3 inclusive; and at least one siloxy unit of the formula $$\frac{R_cSiO_{4-c}}{2}$$

wherein R is the same as defined above and $c$ has a value of 0 to 3 inclusive and a polyalkylene hydroxy compound selected from the class consisting of $HO(C_nH_{2n}O)_yH$ and $R(OC_nH_{2n}O)_yOH$ wherein R $n$ and $y$ are the same as defined above; with the proviso that when the siloxane starting material contains three or more $-NR'R^2$ groups the polyoxyalkylene hydroxy compound can only be $$R(OC_nH_{2n})_yOH$$

14. A process as defined in claim 13, wherein R, R' and R² are lower alkyl radicals; wherein $x$ has a value of 2 to 1000; wherein $n$ has a value of 2 to 4 inclusive; wherein $a$ is 1 and wherein $b$ is 1 or 2.

15. A process as defined in claim 14, wherein R, R' and R² are methyl radicals.

16. A process as defined in claim 13, wherein the carbamate containing siloxane starting material has the average formula $$R_2NCOOSiR_2O(R_2SiO)_xSiR_2OOCNR_2$$

wherein R is a lower alkyl radical; $x$ has a value of from 2 to 1000; and wherein the polyoxyalkylene hydroxy compound is $HO(C_nH_{2n}O)_yH$ wherein n is 2 to 4 inclusive and $y$ has a value of 4 to 1000.

17. A process as defined in claim 16, wherein R is a methyl radical.

References Cited

UNITED STATES PATENTS

| | | | |
|---|---|---|---|
| 3,509,192 | 4/1970 | Niederprüm et al. | 260—448.8 R |
| 3,600,418 | 8/1971 | Bailey et al. | 260—448.8 R |
| 3,629,310 | 12/1971 | Bailey et al. | 260—448.8 R |

DANIEL E. WYMAN, Primary Examiner

P. F. SHAVER, Assistant Examiner

U.S. Cl. X.R.

260—46.5 R

PO-1050
(5/69)

UNITED STATES PATENT OFFICE
CERTIFICATE OF CORRECTION

Patent No. 3,792,073     Dated February 12, 1974

Inventor(s) B. Prokai and B. Kanner

It is certified that error appears in the above-identified patent and that said Letters Patent are hereby corrected as shown below:

In Column 1, line 71; column 6, line 12; column 9, line 34; column 14, line 33 and column 16, line 4; the symbol "(A)", each occurrence, should be deleted.

In column 5, line 38, the far left portion of the siloxane formula shown as "RrSi/O" should be --RrSi[O--.

Column 5, line 43 the term "copolyoxyalkylene" should be --polyoxyalkylene--.

Column 7, line 13 after the term "least 4" insert the phrase ---; wherein w is an integer of at least 4---.

Column 8, line 39 the term "polyaxyalkylene" should be ---polyoxyalkylene---.

Column 10, line 37 the number "3+10$^3$" should be --3X10$^3$--.

Column 11, line 26 "yere" should be --were--.

Column 11, line 58 "therew ere" should be --there were--.

Column 12, line 22 "polymdimethyl" should be --polydimethyl--.

Column 12, line 68 the far right portion of the formula shown as "2$_2$" should be --22--.

Column 14, line 49 and column 16, line 20, cancel "poly-

PO-1050
(5/69)

UNITED STATES PATENT OFFICE
CERTIFICATE OF CORRECTION

Patent No. 3,792,073                    Dated February 12, 1974

Inventor(s) B. Prokai and B. Kanner

It is certified that error appears in the above-identified patent and that said Letters Patent are hereby corrected as shown below:

PAGE 2 alkylene' and insert --polyoxyalkylene--.

Column 15, line 25 before "formula" insert the phrase --polyoxyalkylene hydroxy compound has the average---.

Column 15, line 53 delete "nitrogen" and insert --carbon dioxide--

Signed and sealed this 9th day of July 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,792,073　　　　　　　　Dated February 12, 1974

Inventor(s)　　B. Prokai and B. Kanner

It is certified that error appears in the above-identified patent and that said Letters Patent are hereby corrected as shown below:

In column 10, lines 1 to 2 "U.S. Pats. 3,467,686; 3,530,092; 3,535,357 and 3,519,601 as well as" should be deleted.

In column 13, line 47, "1500" should be ---530---.

Signed and Sealed this sixth Day of April 1976

[SEAL]

Attest:

RUTH C. MASON　　　　　　　　　　C. MARSHALL DANN
*Attesting Officer*　　　　　　　　*Commissioner of Patents and Trademarks*